United States Patent Office 3,445,544
Patented May 20, 1969

3,445,544
RUBBER-REINFORCED ACRYLATE RESIN CONTAINING POLYMERIC EPICHLOROHYDRIN
Joseph Michael Schmitt, Ridgefield, Conn., assignor to American Cyanamid Company, Stamford, Conn., a corporation of Maine
No Drawing. Filed Dec. 20, 1966, Ser. No. 603,173
Int. Cl. C08f 29/50
U.S. Cl. 260—876                10 Claims

ABSTRACT OF THE DISCLOSURE

Compositions comprising a blend of (1) a two-phase impact polymer system composed of (a) a non-rubbery resinous polymer of a methacrylic ester monomer and (b) natural rubber or a synthetic rubber polymer and (2) a homopolymer of epichlorohydrin or a copolymer of epichlorohydrin and an alkylene oxide are disclosed.

---

Impact polymers produced by the blending of hard, resinous polymers with rubbery materials or by the interpolymerization of monomers, which themselves form hard, resinous polymers, with rubbery materials are well known in the art. For example, it is well known that polymers of styrene, i.e. polystyrene, polymethyl styrene and copolymers thereof with acrylonitrile can be blended with various amounts of elastic rubber polymers e.g. butadiene/styrene copolymers, to improve the mechanical properties of the resutlant compositions. These compositions have found use in applications wherein the impact strength or the break-resistance of the final molded article is important. One mapor disadvantage of these impact compositions, however, is their tendency to whiten when bent, hit or otherwise distorted or stressed at the point or area involved. Such a result materially detracts from the overall appearance of the molded articles. This whitening effect has been attributed to the fact that a two-phase system exists, i.e. a resin phase and a rubber phase and true compatability of the phases involved has not been achieved or is not achievable. That is to say, since the rubbery phase and the hard resinous phase are not truly compatible, when the molded article produced from these compositions is distorted, the two phases separate and this separation causes a white imperfection in the distored area.

I have now found that the tendency of these two-phase impact compositions to stress-whiten can be materially reduced by the incorporation therein of a polymer of epichlorohydrin or a copolymer of epichlorohydrin and an alkylene oxide. The addition of these polymers to the impact compositions has been found to result in a more completely compatible blend, which when distorted, has a substantial resistance to stress-whitening. Furthermore, I have found that not only does the above result occur, but the impact strength of the resultant compositions is unexpectedly increased over that of the two-phase system alone.

The epicholorohydrin homopolymers and alkylene oxide copolymers thereof which are used in the production of my novel compositions are well known in the art and are available commercially. Specifically, the homopolymer can be produced by contacting the epichlorohydrin with an organoaluminum catalyst at slightly above room temperature. The alkylene oxides may be copolymerized with the epichlorohydrin in amounts up to about 50%, by weight. More detailed descriptions of these copolymers and methods of their production can be found in U.S. Patents Nos. 3,026,270 and 3,186,958, which patents are hereby incorporated herein by reference.

Specific examples of alkylene oxides which may be used include ethylene oxide, propylene oxide, butene oxides, cyclohexene oxide, vinyl cyclohexene oxide, 1-hexene oxide, trifluoromethylethylene oxide, perfluoropropylene oxide, 1,4-dichloro-2,3-epoxy butane and the like.

In general, the epichlorohydrin homopolymer is composed of recurring units of the formula

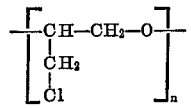

wherein $n$ is the number of recurring units, and the epichlorohydrin/alkylene oxide copolymers are composed of recurring units of the formula

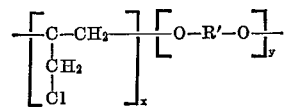

wherein R' is an alkylene radical and the ratio of $x{:}y$ ranges from about 1000:1 to 1:10, respectively. The epichlorohydrin polymers are generally elastomeric in nature. They are impermeable to gases and have a high resistance to solvent, fuels and oils. They are easily fabricated and are thermally stable.

The two-phase, rubber impact systems with which the above-described epichlorohydrin polymers are blended are composed of a polymer of an alkyl methacrylate having the formula (I)

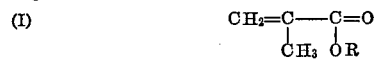

wherein R is an alkyl radical of 1–3 carbon atoms, inclusive, as the hard resinous phase, and a natural or synthetic rubber. The hard resin must be composed of at least 60% by weight, of the methacrylic ester, and may contain up to 40% by weight, of any one or more of such monomers as the unsaturated alcohol esters, more particularly the allyl, vinyl, butenyl, etc., esters of saturated and unsaturated aliphatic and aromatic monobasic and polybasic acids such, for instance, as acetic, propionic, crotonic, oxalic, malonic, succinic, adipic, maleic, fumaric, itaconic, benzoic, phthalic, etc., acids; the saturated monhydric alcohol esters, e.g., the methyl, ethyl, propyl, etc., esters of ethylenically unsaturated aliphatic monobasic and polybasic acids, illustrative examples of which appear above; unsaturated ethers, e.g., ethyl vinyl ether, diallyl ether, etc.; unsaturated amides, for instance, acrylamide, and N-substituted acrylamides, e.g., N-methylol acrylamide, unsaturated ketones, e.g., methyl vinyl ketone, etc.; ethylene; acrylates such as methyl acrylate, ethyl acrylate etc.; vinyl halides, such as vinyl chloride, including vinylidene halides such as vinylidene chloride, vinylidene fluoride and the like.

Among the comonomers which are preferred for use in carrying out invention into effect are, for example, compounds such as acrylonitrile; the various substituted acrylonitriles (e.g., methacrylonitrile, ethacrylontrile, phenylacrylonitrile, etc.), vinyl compounds (including monovinyl aromatic hydrocarbons), e.g., styrene, o-, M-, and p- chlorostyrenes, -bromostyrenes, -fluorostyrenes, -methylstyrenes, -ethylstyrenes, the various polysubstituted styrenes such, for example, as the various di-, tri-, and tetra-chlorostyrenes, - bromostyrenes, -fluorostyrenes, -methylstyrenes, -ethylstyrenes, etc.; vinyl naphthalene, vinyl pyridine, divinyl benzene, trivinyl benzene, allylbenzene, diallyl benzene, etc.

Other monomers copolymerizable with the alkyl methacrylates are given, for instance, in United States Patent No. 2,601,572, dated June 24, 1952, where examples are given both by classes and species.

Of course, it is also possible to utilize copolymers produced from two or more of the monomers represented by Formula I above, and still obtain the benefits heretofore set forth.

Examples of the rubbery materials which may constitute the second phase of the impact system include polymers and copolymers derived from diolefins such as butadiene-1,3; isoprene; 2,3-dimethylbutadiene-1,3; 1,4-dimethylbutadiene - 1,3; piperylene; heptadiene - 1,3; 2-methyl pentadiene-1,5; 2-methyl-3-butyl butadiene-1,3; 2,3-diethyl butadiene. The rubbery material may consist entirely of a natural rubber material may consist entirely of a natural rubber or a synthetic rubber diolefin i.e. a homopolymer, although the diolefin rubbery polymers usually contain from about 5% to 40% of an olefinic modifying comonomer, such as those specified above, e.g. styrene, acrylonitrile, methyl methacrylate. Thus, such rubbers as styrene-butadiene, neoprene rubber, butyl rubber, silicone rubber, polyacrylate rubber, pyridine-butadiene rubbers, chlorosulfonated polyethylene etc. may be used. The styrene-butadiene and acrylonitrile-butadiene rubbers are now generally referred to as SBR and NBR rubbers. More specific examples of such rubbers are set forth in U.S. Patent No. 3,090,767 which patent is hereby incorporated herein by reference. Additionally, grafted rubbers may constitute the rubbery phase of the impact systems. Such rubbers are prepared by grafting vinyl monomers, e.g. those mentioned above, onto the rubbery polymer backbone by methods known in the art, e.g. emulsion polymerization. Rubbery polymers of this type are disclosed in U.S. Patent No. 2,857,360 as well as Canadian Patent No. 628,148 and British Patent No. 910,702, which patents are also incorporated herein by reference.

The two-phase, rubber-modified impact system may be blended with the epichlorohydrin polymer by any known means. For example, I may use a ball mill, a two-roll mill, a banbury mixer, a devolatilizer-extruder, etc. to produce my novel compositions.

The epichlorohydrin polymers may be blended with the rubbery impact polymer composition in amounts ranging from about 5%–30%, preferably about 15%–25%, by weight, based on the total weight of the impact polymer system.

Various dyes, pigments, stabilizers, inhibitors, fillers, etc. may be added to my novel compositions as well within the scope of the instant invention.

My novel compositions find use as molding compounds and may be used, as such, in all applications wherein existing impact systems have been found successful.

The following examples are set forth for purposes of illustration only and are not to be considered as limitations on the instant invention except as set forth in the appended claims. All parts and percentages are by weight unless otherwise indicated.

EXAMPLE 1

271 parts of an impact polymer composed of a methyl methacrylate/styrene/acrylonitrile terpolymer (71/19/10), 77.5%, as the resin phase, and polybutadiene grafted (2/1) with methyl methacrylate, styrene and acrylonitrile (78/19/3), 22.5%, as the rubber phase, is heat plasticized on a rubber mill at about 170° C. To this material is added 57 parts of a commercially available rubbery epichlorohydrin-ethylene oxide copolymer (50/50) having a specific gravity of 1.27. The mixture is milled for 5 minutes and the resultant composition is then injection molded into bars ¼″ x ½″ x 2½″. The bars are light yellow and transparent and exhibit a much decreased strain-whitening tendency, as compared to a bar of the impact polymer without the added epichlorohydrin copolymer, when clamped upright in a vise and simultaneously flexed. The properties of the two compositions are set forth in Table I, below.

TABLE I

| | Impact polymer-epichlorohydrin polymer blend | Impact polymer alone |
|---|---|---|
| Notched izod impact strength (f.p.p.i.) | 3.12 | 2.00 |
| Tensile strength at yield (p.s.i.) | 4,000 | 7,000 |
| Modulus (p.s.i.) | 0.23×10⁶ | 0.37×10⁶ |
| Elongation (percent) | 3.6 | 3.6 |
| Tensile strength at break (p.s.i.) | 4,800 | |
| Elongation (percent) | 48 | 28 |
| DTL (264 p.s.i.) (° C.) | 50 | 90 |
| Result when flexed | Transparent | Opaque white |

EXAMPLES 2–8

Following the procedure of Example 1, various compositions within the scope of the instant invention were produced. The results are set forth in Table II, below. All concentrations and amounts remained constant unless otherwise specified. In each instance, the resultant composition exhibited significantly decreased stress-whitening and increased impact strength.

TABLE II

| | Impact composition | | Epichlorohydrin polymer |
|---|---|---|---|
| Ex. | Resin phase | Rubber phase | |
| 2 | Methyl methacrylate/styrene copolymer (60/40). | Butadiene/styrene (81/19) grafted with methyl methacrylate and styrene (60/40). | Same as Example 1. |
| 3 | Methyl methacrylate/styrene/acrylonitrile terpolymer (65/20/15). | Butadiene/acrylonitrile (90/10). | Do. |
| 4 | Same as Example 1. | Same as Example 1. | Commercially available poly(epichlorohydrin)-specific gravity, 1.36. |
| 5 | Methyl methacrylate/styrene copolymer (70/30). | Isoprene rubber. | Same as Example 1. |
| 6 | Ethyl methacrylate/styrene copolymer (70/30). | Polybutadiene. | Same as Example 4. |
| 7 | Poly(methylmethacrylate). | Butadiene/ethyl acrylate copolymer (50/50). | Epichlorohydrin/propylene oxide copolymer (50/50). |
| 8 | Propyl methacrylate/styrene copolymer (70/30). | Polybutadiene. | Epichlorohydrin/ethylene oxide copolymer (75/25). |

I claim:
1. A composition of matter comprising (A) a rubber-reinforced, two-phase impact polymer comprising (a) a resinous polymer of at least 60% by weight of a monomer having the formula

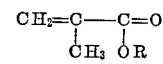

wherein R is an alkyl radical of 1–3 carbon atoms, inclusive, and (b) a natural rubber or a synthetic rubbery diene polymer and (B) from about 5% to about 30% by weight, based on the total weight of the composition, of a polymer selected from the group consisting of a poly(epichlorohydrin) and a copolymer of epichlorohydrin and up to about 50% by weight of an alkylene oxide.

2. A composition according to claim 1 wherein (a) is a polymer of methyl methacrylate.

3. A composition according to claim 1 wherein (a) is a polymer of ethyl methacrylate.

4. A composition according to claim 1 wherein (a) is a polymer of propyl methacrylate.

5. A composition according to claim 1 wherein (b) is polybutadiene grafted with a vinyl monomer.

6. A composition according to claim 1 wherein (B) is poly(epichlorohydrin).

7. A composition according to claim 1 wherein (B) is a copolymer of epichlorohydrin and an alkylene oxide.

8. A composition according to claim 1 wherein (B) is a copolymer of epichlorohydrin and ethylene oxide.

9. A composition according to claim 1 wherein (A) is an impact polymer composed of (a) a terpolymer of methyl methacrylate, styrene and acrylonitrile and (b) polybutadiene grafted with methyl methacrylate, styrene and acrylonitrile.

10. A composition according to claim 9 wherein (B) is a copolymer of epichlorohydrin and ethylene oxide.

References Cited

UNITED STATES PATENTS

| | | |
|---|---|---|
| 3,278,457 | 10/1966 | Milgrom. |
| 3,285,804 | 11/1966 | Robinson _____ 260—4 XR |
| 3,336,417 | 8/1967 | Sakuma et al. ____ 260—876 XR |
| 3,354,238 | 11/1967 | Schmitt et al. _____ 260—876 |

GEORGE F. LESMES, *Primary Examiner.*

U.S. Cl. X.R.

260—4, 887, 888, 827, 897, 901